No. 746,689.  
Patented December 15, 1903.

UNITED STATES PATENT OFFICE.

DANIEL HENRI DUPONT-FRANKLIN, OF NEW YORK, N. Y.

METHOD OF MANUFACTURING A SUBSTANCE RESEMBLING INDIA-RUBBER.

SPECIFICATION forming part of Letters Patent No. 746,689, dated December 15, 1903.

Application filed May 13, 1903. Serial No. 156,983. (No specimens.)

*To all whom it may concern:*

Be it known that I, DANIEL HENRI DUPONT-FRANKLIN, a citizen of the French Republic, residing in the city, county, and State of New York, have invented a certain new and useful Method of Manufacturing a Substance Resembling India-Rubber, of which the following is a full, clear, and exact specification.

In general terms my invention consists in combining a hydrocarbon and a suitable acid, boiling the mixture so formed, and feeding oxygen thereto.

As a specific example of my invention I may take one hundred parts of a hydrocarbon—such, for instance, as coal-tar—and mix it with twenty-five parts of an acid, such as boracic acid dissolved in alcohol, and boil the mixture a proper length of time and then introduce the same into a vessel heated to about 60° centigrade into which oxygen is introduced.

As it is necessary to know when the mixture of hydrocarbon (coal-tar) and acid (boracic acid) has been sufficiently boiled, the vapors which arise during the boiling are ignited and the boiling is permitted to continue until a green flame appears, such green flame being the signal that the mixture has been sufficiently boiled.

It is understood that my invention is not limited to the mixture of coal-tar and boracic acid, but that coal-tar may be replaced by tar of petroleum or other hydrocarbons and that the boracic acid may be replaced by phosphoric or hydriodic or other acids.

What I claim as new, and desire to secure by Letters Patent, is—

The herein-described process of manufacturing a substance resembling india-rubber which consists in mixing together coal-tar and boracic acid dissolved in alcohol, boiling said mixture and supplying oxygen thereto, substantially as described.

In witness whereof I have hereunto set my hand, in presence of two witnesses, at New York, this 12th day of May, 1903.

DANIEL HENRI DUPONT-FRANKLIN.

In presence of—
ALFRED L. WEISSENTHANNY,
OTTO MUNK.